STEREOSCOPIC PICTURE PROJECTION AND VIEWING MEANS FOR THEATRES

Filed Aug. 16, 1957 3 Sheets-Sheet 1

INVENTOR.
Eugenio Jordana Pareto
BY
RICHARDSON, DAVID + NORDON
ATTORNEYS.

INVENTOR:
Eugenio Jordana Pareto
BY
RICHARDSON, DAVID & NORDON
ATTORNEYS.

Nov. 13, 1962 EUGENIO JORDANA PARETO 3,063,333

STEREOSCOPIC PICTURE PROJECTION AND VIEWING MEANS FOR THEATRES

Filed Aug. 16, 1957 3 Sheets-Sheet 3

INVENTOR.
Eugenio Jordana Pareto
BY
RICHARDSON, DAVID & NORDON
ATTORNEYS.

United States Patent Office 3,063,333
Patented Nov. 13, 1962

3,063,333
STEREOSCOPIC PICTURE PROJECTION AND VIEWING MEANS FOR THEATRES

Eugenio Jordana Pareto, 2 Pablo Pinol St., San Baudilio de Llobregat, Barcelona, Spain Filed Aug. 16, 1957, Ser. No. 678,589
Claims priority, application Spain June 2, 1951
7 Claims. (Cl. 88—16.6)

The present invention relates to a stereoscopic projection and viewing system of the non-polarized and grid type for use in the viewing of pictures in theatres, and more particularly in theatres which are provided with numerous rows of seats so that spectators in different rows are seated at different distances from the projection screen.

This is a continuation-in-part of application Serial No. 246,076 filed Sept. 11, 1951, now abandoned.

Heretofore, it has been known to sub-divide each picture of a stereoscopic pair into a plurality of narrow horizontally spaced vertical strips and to recombine the strips of each separate picture alternately with those of the other picture such that the resulting composite picture consists of an interlaced striation of both pictures of the stereoscopic pair. One set of alternate strips, representing one picture of the stereoscopic pair, may be viewed separately from the other set of alternate strips representing the other picture by the interposition of a viewing grid between the spectator and the projection screen. The viewing grid consists of a plurality of horizontally spaced opaque vertical grid elements with transparent interstices (or void spaces) between them. The width of the grid elements and their distance from the projection screen can be so adjusted with respect to the average interpupillary distance of the spectator that the vision of the right eye of the spectator is obsecured by the grid elements with respect to the alternate vertical strips which constitute the left eye picture so that the right eye is thus permitted to see through the interstices between the opaque grid members only the alternate vertical strips which constitute the right eye picture of the stereoscopic pair. The grid is further so dimensioned and positioned that it obscures the vertical strips of right eye picture when viewed by the left eye. Similarly, the left eye sees only the strips of the left eye picture. If the viewing grid is not correctly dimensioned and positioned, the stereo effect will be lost. Therefore, in view of the above, it should be apparent, where the conventional full and stationary projection screen is employed, that but one viewing grid could be employed, and that all spectators would have to be seated at the same distance from the screen.

The present invention involves the projection of two interlaced stereoscopic images arranged in adjacent vertical strips as described above; in this instance, however, the projection screen consists of a plurality of relatively narrow and vertically spaced horizontal projection strips or screen elements. For example, referring to a single, narrow and horizontally-extending screen element, disposed above the heads of the spectators, persons seated in different rows of seats at different distances from the screen will look upwardly at different angles in order to view this element. Also, since this screen element is relatively narrow, it is possible to employ a separate narrow viewing grid for each row which will not interfere with the viewing grids used for the other rows. Accordingly, a separate narrow viewing grid is employed for each row of seats so that each grid element will be interposed between the eyes of the spectator and the projected horizontal picture element, and the grid is appropriately spaced from the screen so that a separate vertically striated image is viewed by each eye of a particular spectator, irrespective of his distance from the projection screen.

In order to avoid the horizontal striation effects which might otherwise occur with the vertically spaced screen elements, the latter elements are vertically reciprocated to scan and intercept a full horizontal band or zone of the projected picture. Also, by vertically reciprocating these horizontal screen elements at an appropriate speed, the retinal retentivity or persistence effect of the eye will eliminate the striation effects. The frequency of vertical reciprocation, in the case of motion pictures, is further so selected that a stroboscopic effects are avoided.

By providing a plurality of uniformly vertically spaced narrow horizontally extending image projection surfaces lying in a common vertical plane (which constitutes the effective projection screen) and by reciprocating the strip-shaped surfaces to vary the elemental horizontal areas of the projected picture which are reproduced thereon within a full horizontal zone, the distance through which the strip-shaped image reproducing surfaces must be vertically reciprocated is materially reduced. Obviously, the greater the number of uniformly spaced horizontal strips, the smaller will be the total vertical excursion required to eliminate the visual striation effects which would inherently ensue from the projection of the image upon a group of vertically spaced narrow horizontally extending projection surfaces.

Therefore it is a principal object of the present invention to provide a stereoscopic projection and viewing system of the non-polarized type wherein the resulting stereoscopic projection may be viewed stereoscopically at each of a plurality of different distances from the projection surface without requiring the use of special viewing glasses or other similar optical devices.

It is a further object of the present invention to provide in a theatre a projection and viewing system including (1) a pair of spaced projectors, said projectors producing separate images for the left and right eyes, respectively, of an average human spectator, (2) means for separating alternate vertical portions of the beams issuing from each projector and for recombining these vertical portions as alternate vertical strips upon a vertically disposed projection surface, (3) means for subdividing the latter-mentioned projection surface into a plurality of vertically spaced horizontal screen elements, (4) a separate group of narrow horizontal viewing grids corresponding to each row of seats in the theatres, each viewing grid consisting of a series of alternate opaque and transparent vertical bands and being interposed between the spectators and the screen elements, and (5) means for vertically reciprocating each horizontal screen element while maintaining each corresponding viewing grid in proper alignment with the eyes of the spectators in the corresponding row.

Other and further objects and advantageous features of this invention will hereinafter more fully appear in connection with a detailed description of the drawings, in which.

Figure 1:
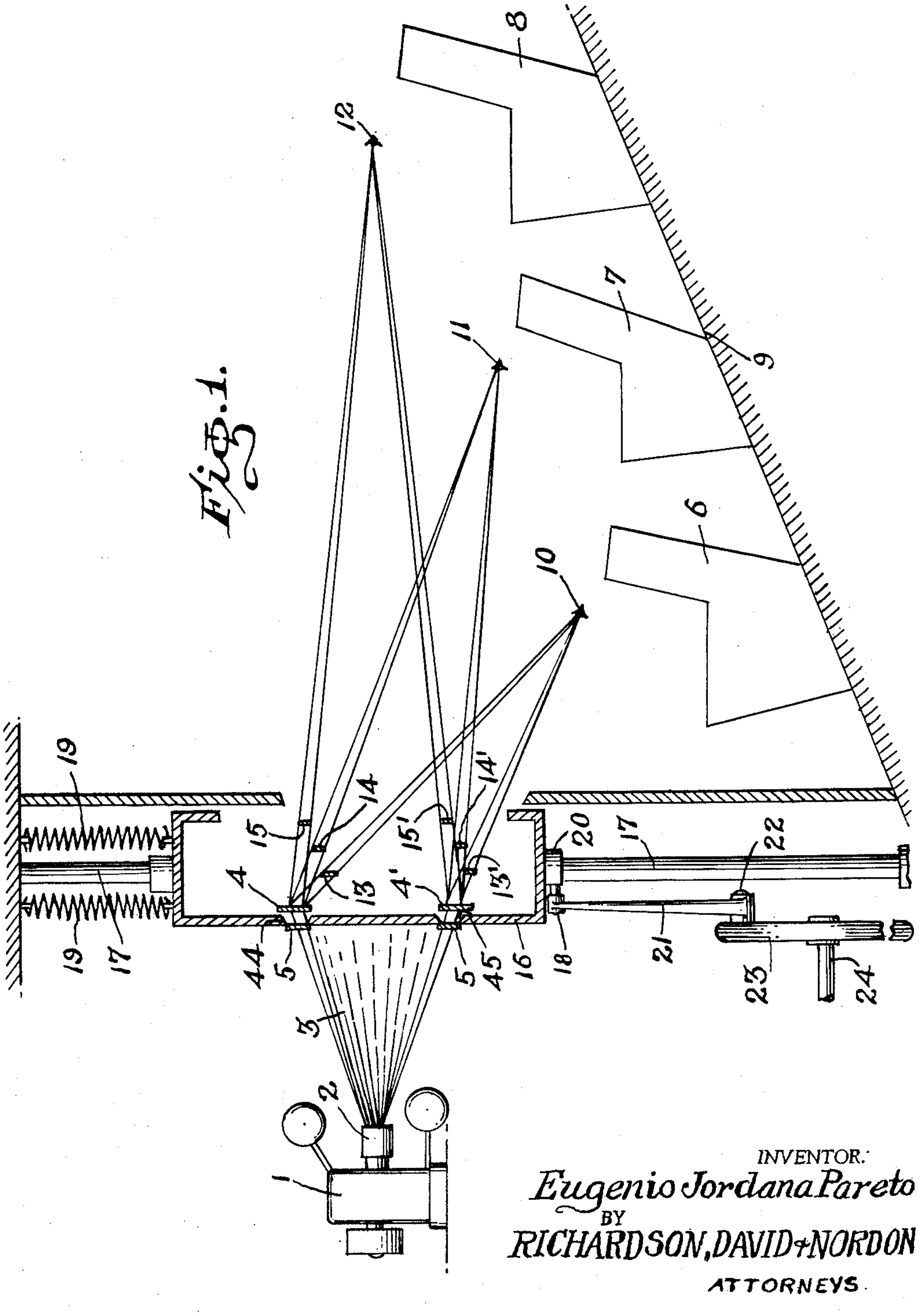
FIGURE 1 is a semi-diagrammatic view in side elevation (and partly in section) showing the relationships among the projection means, the narrow horizontal screen elements, the spectators in three different rows in the theatre, and the viewing grids interposed between each screen element and each separate row of spectators.
Figure 4:
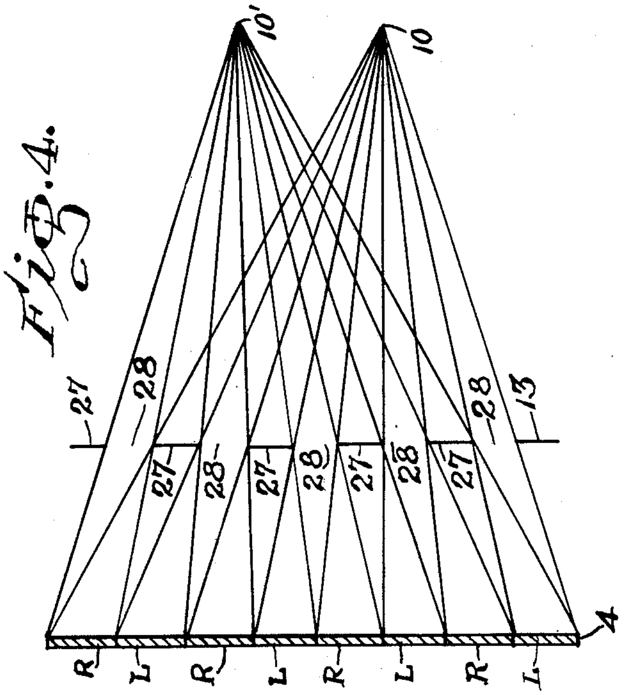
FIGURE 4 is a semi-diagrammatic plan view (partly in section) representing the right-hand portion of FIGURE 1 (from above) and showing the horizontal relationships among the projection screen, the eyes of a spectator in a given row and the properly positioned viewing grid corresponding to the given row.

Referring to the drawings in detail, in FIG. 1 is shown a stereoscopic projection and viewing system including a projector 1 having beam emitting portion 2 capable of projecting a beam 3 onto a pair of upper and lower translucent screen elements 4 and 4' through a pair of projection grids 5 and 5' (the construction of which will hereinafter be set forth in greater detail). On the opposite side of screen 4 and 4' from the projector 1 a plurality of rows of seats 6, 7 and 8 are so positioned in the theatre 9 that spectators' eyes 10, 11 and 12, respectively (one eye only of each spectator appearing in this view) will not be obstructed by the spectators in the other rows. Between the eyes 10 and 10' (see also FIG. 4) of the spectator in row 6 and the screen element 4 is a viewing grid 13; between these eyes 10 and 10' and the screen element 4' is a viewing grid 13'. Similarly, the eyes 11 and 11' are provided with viewing grids 14 and 14'; finally, the spectator sitting in row 8 is provided with viewing grids 15 and 15'. Although but three rows of seats are shown, for the sake of convenience and simplicity, it should be understood that a considerably larger number of rows may be employed.

FIGURE 1 also shows that the projection grids, viewing grids, and screen elements may be housed within the same casing or box 16. These elements may be mounted within the box by securing the ends of the strips to the sides of the box. The box 16 is slidably mounted on a pair of vertical guides or bars 17 fixed to the floor and ceiling of the theatre. A pin 18 integral with the bushing 20 on the box 16 is pivotally secured to the upper end of a connecting rod 21; the lower end of the connecting rod is pivotally attached to another pin 22 which is eccentrically disposed on a flywheel 23, the latter being rotated by a drive shaft 24. Springs 19 coacting between the ceiling of the theater and the top of the box tend to minimize the load on the driving mechanism. The above-described mounting of the box 16 will provide vertical reciprocatory movement of the box and contents for reasons appearing hereinafter.

Figure 2:
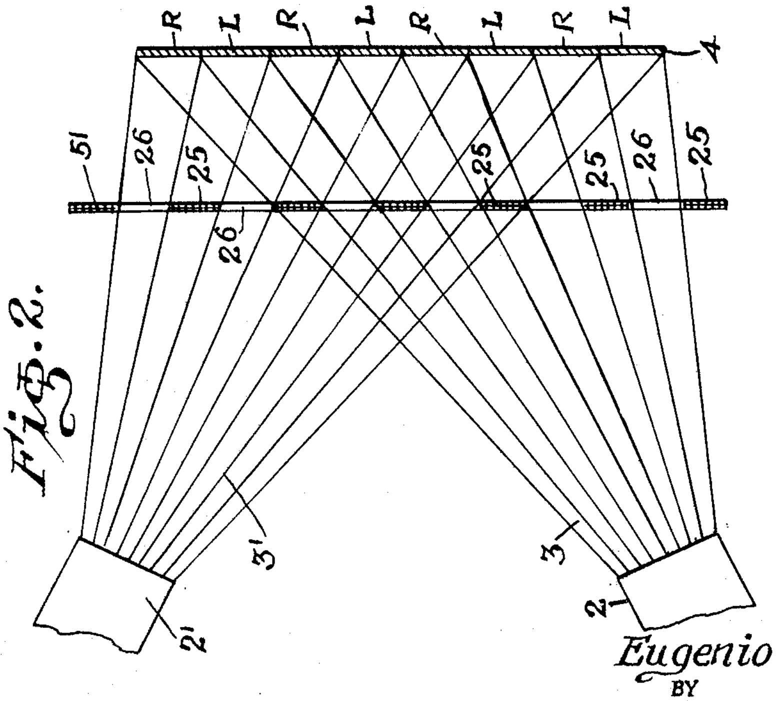
FIGURE 2 is a semi-diagrammatic plan view (partly in section) representing the left-hand portion of FIGURE 1 as viewed from above and showing the horizontal arrangement of the two projectors, the projection screen, and the interposed projection grid.

FIGURE 2 shows, diagrammatically, how the two stereoscopic images are combined as vertical bands on the surface of the screen 4. As indicated previously with reference to FIGURE 1, projector 1 will direct a beam 3 from portion 2; this beam will represent one of the two stereoscopic pictures referred to herein. The other stereoscopic picture will be emitted as beam 3' from projector portion 2' which could be part of projector 1 or part of a separate similar projector. At any event, the projectors for the two beams 3 and 3' must be synchronized. The projection grid 5 is composed of alternate vertical opaque strips 25 and alternate vertical transparent strips or voids 26. Assuming that beam 3 will represent the stereoscopic image intended for the left eye, the portions of the beam 3 passing through the transparent strips or openings 26 will cast vertical strip-images L on the translucent screen 4. Similarly, the beam 3', representing the right eye picture will cast vertical strip-images R on the screen 4. Therefore, the composite picture on the screen 4 will consist of one set of alternate vertical images for the left eye and a second set of alternate vertical images for the right eye, the two sets being arranged in staggered or interlaced relation.

Figure 3:
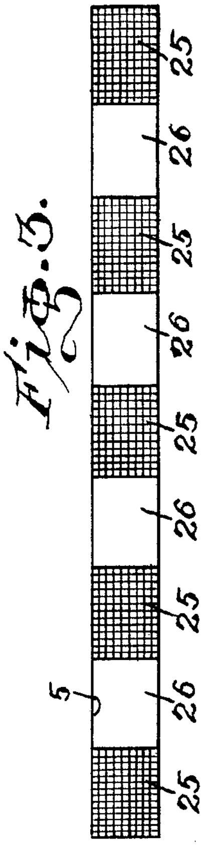
FIGURE 3 is an enlarged fragmentary and semi-diagrammatic rear elevation of the projection grid shown in FIGURE 2; the arrangement shown in this view also represents the type of structure employed for the viewing grids as well.

FIGURE 3 shows the projection grid 5 as it would appear in rear (or front) elevation. The grid 5 is a narrow horizontally extending strip having alternate vertical opaque strips 25 and alternate vertical transparent strips 26.

Since the screen 4 is translucent, the image projected onto the rear surface of the screen will also appear on the front surface. Therefore, in FIGURE 4, the viewing grid 13 composed of alternate vertical opaque strips 27 and alternate vertical transparent or open portions 28 (similar to the grid shown in FIGURE 3) is so positioned that the left eye 10 will see only those images designated as L; similarly, the right eye 10' will see only those images designated as R.

Figure 5:
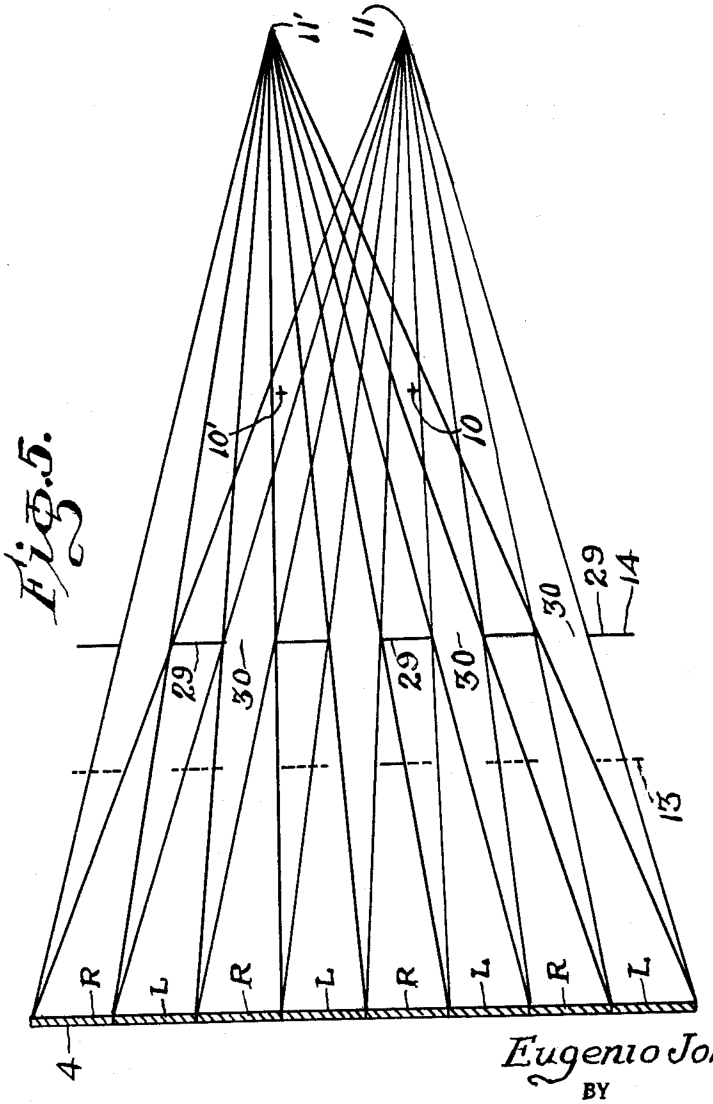
FIGURE 5 is a semi-diagrammatic plan view similar to FIGURE 4 showing a new screen-grid-spectator relationship for a row farther removed from the screen than that shown in FIGURE 4.

In FIGURE 5 the same screen 4 is shown with alternate vertical images L and R. The left eye 11 and right eye 11' of the spectator sitting in row 7 will now view the screen 4 through the grid 14 which is composed of alternate vertical opaque strips 29 and alternate open or transparent portions 30. The grid 14 is so positioned that left eye 11 sees only images L and the right eye 11' sees only images R. For the purposes of comparison, the relative position of eyes 10 and 10' of a spectator in row 6 is indicated together with the proper relative position of the corresponding viewing grid 13, which is shown in dotted lines. Note that if the grid 13 were extended upwardly into the line of sight of eyes 11 and 11', the images L and R could not be properly viewed by these eyes through grid 13.

The horizontal width of the images L and R, as well as the corresponding widths of the opaque portions of the various projection and viewing grids have been somewhat exaggerated herein to emphasize the instant invention. In actual practice, it would be advisable to use a considerably larger number of vertical strip-images of considerably reduced width.

Figure 6:
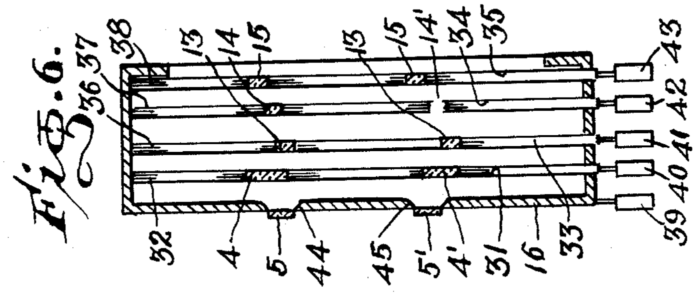
FIGURE 6 is a semi-diagrammatic side elevation (partly in section) showing means for reciprocating the screen elements and the various projection and viewing grids.

As indicated previously, since the projection field consists of a series of horizontal screen elements, it will be necessary to provide a means for vertically reciprocating these elements in order that the entire vertical field of projection will be scanned. Also, the rate of reciprocation should be other than a multiple or sub-multiple of the speed of the projector so as to avoid any undesirable stroboscopic effect. FIGURE 1 shows a simplified system for reciprocation wherein the screen elements and grids are reciprocated as a unit. However, when the amount of reciprocation is relatively large and the corresponding viewing angle is also large it may be desirable to move the viewing grids independently of the screens so that the eyes, grid and screen will always remain in proper alignment. Therefore, FIGURE 6 shows a semi-diagrammatic representation of a system wherein the screen elements and the various grids may be reciprocated independently. In this instance the screens 4 and 4' are shown mounted in a vertical frame 31 which slides in a vertical groove or track 32 in the sides of the box 16. The viewing grids 13 and 13', 14 and 14', and 15 and 15' are similarly mounted in vertical frames 33, 34 and 35 which would slide in track 36, 37 and 38, respectively. The box 16 including the projection grids 5 and 5', and the frames 31, 33, 34 and 35 are reciprocated vertically by independent reciprocating means 39, 40, 41, 42 and 43, respectively. These last-mentioned means could be the type of reciprocating means shown in FIGURE 1; they could be of the solenoid type, the reversible piston type, or any other conventional reciprocating means. For the above reasons, these reciprocating means are merely shown diagrammatically.

Although the screen elements 4 and 4' have been described as separate and discrete horizontal strips capable of vertical reciprocation, other modifications or concepts of these screen elements fall within the scope of the present invention. As far as the screen elements themselves are concerned, suffice it to say that it is merely necessary to provide a narrow horizontal strip-image (composed, of course, of alternate stereoscopic images) and to provide a means for scanning the entire vertical extent of the projection field. For example, if the screen 4 were a full vertical and fixed screen, the invention as described herein would be entirely operative; since the projection grids 5 and 5′ and the openings 44 and 45 in the rear of box 16 permit only a limited horizontal band onto the screen 4, the vertical movement of the grids 5 and 5′ would cause corresponding movement of the horizontal bands on the screen although the latter was completely stationary. In this regard, the projected horizontal strip would be the "horizontal screen element" referred to in the specification and claims. Conversely, if the regions above, below and between the screen elements 4 and 4′ were filled in with a reflective or absorptive material (which would pass through no light), then the projection grids 5 and 5′ could be replaced by a single stationary sheet of alternate vertical strips of opaque and transparent materials.

Although the drawings show but two horizontal screen elements 4 and 4′, it should be understood that a single element or that a considerably larger number of elements could be employed where desired. For each screen element there should be a complete set of viewing grids with the grids of each set corresponding in number and position to the number and position of the rows of seats in the theatre. Of course, it is appreciated that the number of screen elements of a given size cannot be increased without limit; if one were to attempt to use a considerably large number of screen elements in a theatre having a large number of rows of seats, it is quite likely that the set of viewing grids corresponding to one screen element might improperly obstruct the view to another screen element. Therefore, the desired vertical width of these horizontal screen elements and the number and positions of the rows of seats must be considered before deciding on an optimum number of screen elements.

Other and further changes and modifications apart from those shown or suggested herein may be made within the spirit and scope of this invention.

What is claimed is:

1. A method for viewing of a stereoscopic pair of pictures wherein said pictures to be produced are projected as a pair of beams in vertically striated interlaced relation at a vertical plane, comprising the steps of: subdividing said plane into a pair of vertically spaced and horizontally extending screen bands, whereby two series of alternate elementary pictures are obtained on each of the said screen bands, each series corresponding to one of the projected beams, then providing for the stereoscopic viewing of the pictures on each screen band through a viewing grid for each of a plurality of rows of seats located at different distances from said plane, each viewing grid for each row of seats being in steroscopic distance relation with both the screen band and row of seats involved, and then synchronously vertically reciprocating the screen bands and viewing grids, the length of the movement of the screen bands being at least equivalent to the distance between adjacent screen bands to scan the whole projection area, the speed of this movement being such that a viewing persistence effect on the screen bands is produced, the length of the movement of the viewing grids being such that each viewing grid is always placed in a straight line with the screen band and the corresponding row of seats.

2. A method for the stereoscopic projection and viewing of cinematographic pictures, comprising the steps of: projecting a pair of spaced projection points as a pair of projection beams, directing said beams towards a common vertical surface, selecting alternate vertical portions from each beam and combining the selected portions of both beams alternately on said vertical surface, selecting from the combined beams a plurality of vertically spaced horizontal transverse bands, projecting said horizontal bands onto respective vertically spaced horizontal screen bands lying in said surface, then providing for the stereoscopic viewing of the pictures on each screen band through a viewing grid for each of a plurality of rows of seats located at different distances from said surface, each viewing grid for each row of seats being in stereoscopic distance relation with both the screen band and row of seats involved, and then synchronously vertically reciprocating said screen bands and said viewing grids, the length of the movement of the screen bands being at least equivalent to the distance between adjacent screen bands to scan the whole projection area, the speed of said movement being such that a viewing persistence effect on the screen bands is produced, the length of the movement of said viewing grids being such that each viewing grid is always placed in a straight line with the screen band and the corresponding row of seats.

3. A method for the stereoscopic projection and viewing of cinematographic pictures, comprising the steps of: projecting a couple of pictures in stereoscopic relation from a pair of spaced projection points as a pair of projection beams directed towards a common vertical surface, selecting from the said beams a plurality of vertically spaced horizontal bands by means of projection grids, said projection grids including vertical alternate slits and opaque bands, projecting the selected bands into respective vertically spaced horizontal screen bands lying in said vertical surface, the distances from said screen bands to said projection grids and from said screen bands to said projection points being such that two series of alternate elementary pictures are obtained on each of the said screen bands, each series corresponding to one of the projected beams, then providing for the stereoscopic viewing of the pictures on each screen band through a viewing grid for each of a plurality of rows of seats in a projection hall, each viewing grid for each row of seats being in stereoscopic distance relation with both the screen band and row of seats involved, and then synchronously vertically reciprocating the ensembles of screen bands, projection grids and viewing grids, the length of the movement of the screen bands being at least equivalent to the distance between adjacent screen bands so as to scan the whole projection area, the speed of said movement being such that a viewing persistence effect of the screen band is produced, the length of the movement of both the viewing and projection grids being such that the viewing grids are always placed on a straight line with the screen band and row of seats involved and the projection grids being always in a straight line with the screen band involved and the projection points.

4. In a system for the stereoscopic projection of cinematographic pictures, a plurality of vertically spaced and vertically reciprocable horizontal screen bands, said screen bands lying in the same vertical plane, a projection device for projecting a pair of stereoscopic pictures in stereoscopic relation towards said plane and for forming on each of said screen bands vertical strip images from said pictures in vertically striated interlaced relationship, a vertically reciprocable horizontal projection grid band for each screen band, said projection grids being parallel to the screen bands, said projection grids being in stereoscopic distance relation with both the screen bands and the projection device, means for vertically reciprocating said screen bands, a plurality of rows of seats for a plurality of spectators, a vertically reciprocable group of viewing grids for each screen band, each group of viewing grids including a viewing grid for each row of seats, said viewing grids being parallel to the screen bands and including vertical parallel slits and opaque bands, each one of said viewing grids being in stereoscopic distance relation with both the corresponding screen band and row of seats, and means for reciprocating the ensemble of viewing grid groups synchronously with respect to the reciprocation of said screen bands so that each screen band is always in a straight line with a given viewing grid and the corresponding row of seats.

5. In a system for the stereoscopic projection of cinematographic pictures, a plurality of vertically spaced and vertically reciprocable horizontal screen bands, said screen bands lying in the same vertical plane, a projection device for projecting at least one couple of stereoscopic pictures in stereoscopic relation on to the said screen bands, a vertically reciprocable horizontal projection grid band for each screen band, said projection grids being parallel to the screen bands, said projection grids being in stereoscopic distance relation with both the screen bands and the projection device, means for synchronously vertically reciprocating both the ensembles of screen bands and projection grids so that each screen band is always in a straight line with the involved projection grid and the projection device, a plurality of rows of seats for a plurality of spectators, a vertically reciprocable group of viewing grids for each screen band, each group of viewing grids including a viewing grid for each row of seats, said viewing grids being parallel to the screen bands and including vertical parallel transparent slits and opaque bands, each one of said viewing grids being in stereoscopic distance relation with both the corresponding screen band and row of seats, and means for reciprocating the ensemble of viewing grid groups synchronously with respect to the reciprocation of the described screen band and projection grid ensembles so that each screen band is always in a straight line with a given viewing grid and the corresponding row of seats.

6. In a system for the stereoscopic projection of cinematographic pictures, a plurality of vertically spaced and vertically reciprocable horizontal screen bands, said screen bands being translucent and lying in the same vertical plane, a projection means for projecting a pair of stereoscopic pictures in stereoscopic relation to the said screen bands, a vertically reciprocable horizontal projection grid band for each screen band, said projection grids being parallel to the screen bands, said projection grids being in stereoscopic distance relation with both the screen bands and the projection device, means for synchronously vertically reciprocating both the ensembles of screen bands and projection grids so that each screen band is always in a straight line with the involved projection grid and the projection device, a plurality of rows of seats for a plurality of spectators, located on the opposite sides of said plane from said projection means, a vertically reciprocable group of viewing grids for each screen band, each group of viewing grids including a viewing grid for each row of seats, said viewing grids being parallel to the screen bands and including vertical parallel slits and opaque bands, each one of said viewing grids being in stereoscopic distance relation with both the corresponding screen band and row of seats, and means for reciprocating the ensemble of viewing grid groups synchronously with respect to the reciprocation of the described screen band and projection grid ensembles so that each screen band is always in a straight line with a given viewing grid and the corresponding row of seats.

7. A system for the projection and viewing of a stereoscopic pair of images including a generally vertical and rectangular viewing plane at which said images to be produced are projected in vertically striated interlaced relationship and a plurality of spaced rows of seats for spectators located at different distances from said viewing plane and extending parallel to said plane, said viewing plane and said seats being so arranged that any horizontal line of the plane is viewed from each row of seats at an appreciably different and distinct angle in a vertical plane, said system comprising a plurality of vertically movable and vertically spaced narrow horizontally extending strip-shaped projection surfaces coplanar with said viewing plane and upon which a narrow horizontally extending picture element of said interlaced images is formed; and individual viewing grid means positioned between each of said rows of seats and each of said strip-shaped projection surfaces, said viewing grid means being vertically movable with said strip-shaped projection surfaces and comprising a plurality of horizontally shaped short opaque vertical grid elements positioned before each projection surface and so spaced therefrom that each vertical portion of every grid element which is seen at said distinct angle from a particular row of seats is so spaced from each projection surface that the left eye and the right eye of a spectator seated in said particular row will each see a different series of said striated portions of said interlaced images on said projection surface corresponding to the appropriate image of the stereoscopic pair, whereby vertical reciprocation of said strip-shaped projection surfaces and said grid means will scan the entirety of said interlaced images projected at said viewing plane.

References Cited in the file of this patent

UNITED STATES PATENTS

| | | |
|---|---|---|
| 1,772,782 | Noaillon | Aug. 12, 1930 |
| 2,139,855 | Genies | Dec. 13, 1938 |
| 2,309,879 | Willis | Feb. 2, 1943 |
| 2,348,818 | Jacobson | May 16, 1944 |
| 2,351,033 | Gabor | June 13, 1944 |
| 2,421,393 | Savoye | June 3, 1947 |

FOREIGN PATENTS

| | | |
|---|---|---|
| 822,404 | France | Sept. 20, 1937 |
| 570,594 | Great Britain | July 13, 1945 |